Patented June 15, 1937

2,084,223

UNITED STATES PATENT OFFICE 2,084,223

RECOVERY OF LIGHT OIL FROM COKE-OVEN GAS

Hobart W. Seyler, Elizabeth, and Joseph H. Wells, Clairton, Pa.

No Drawing. Application September 23, 1935, Serial No. 41,828

2 Claims. (Cl. 196—4)

This invention relates to the recovery of coke-oven by-products in general and is particularly concerned with the recovery of valuable products from waste materials obtained in the recovery and refining of coke-oven light oil and fractions thereof.

In the recovery and refining of coke-oven light oil and fractions thereof, these waste materials are obtained. These wastes are (1) an emulsion of the absorbing oil and water, (2) a lime sludge and (3) benzol acid coke. The disposal of these waste materials has been a problem of great concern to coke works, gas works and petroleum refiners on account of atmospheric and stream pollution and are fire hazards. We have discovered a process whereby the valuable constituents of the above wastes are recovered and the resulting solids can be disposed of without danger of pollution or fires.

In the recovery of light oil from coke-oven gas by absorption in an absorbing medium such as coal tar oil or petroleum oil, an emulsion of oil and water is obtained from the light oil scrubbing towers, stripping stills, heat exchangers, cooling coils, etc. This emulsion may be either the water in oil or the oil in water type usually stabilized by a resinous or carbonaceous material. It is the usual practice to allow this emulsion to settle either at atmospheric or elevated temperatures, but even after long periods of settling only a small portion of the oil is recovered. The emulsion remaining after a predetermined time of settling is usually disposed of as a waste product and causes stream pollution and is a fire hazard if disposed of on a dump or the like.

In the refining of coke-oven light oil or fractions thereof, a lime sludge is obtained by the neutralization of the acid remaining in the light oil or fractions thereof after the sulphuric acid wash by the use of milk of lime. This sludge contains free lime, calcium sulphate, calcium salts of sulphonic acids, and some of the light oil. It is the usual practice to allow this material to settle for the separation of the light oil. By this method only a small part of the contained light oil is recovered, as the oil is strongly adsorbed by the solids. The disposal of these solids containing the light oil on a dump or the like is not only wasteful but also results in a fire hazard and atmospheric or stream pollution.

The benzol acid coke obtained by steaming the sulphuric acid used in the refining of light oil or fractions thereof consists principally of highly polymerized organic matter and contains some oil and free acid. This coke is very difficult to dispose of since it is quite acidic and inflammable and also causes atmospheric and stream pollution. No satisfactory means of disposal of this waste material was known.

We have found that by mixing the water-oil emulsion with at least sufficient lime sludge to make the mixture alkaline followed by acidifying to a pH of 1 to 6.9 a coagulation of the emulsions is obtained. The absorption oil containing the light oil in solution is then separated from the solids and water by settling or preferably by filtration. The solids obtained by this method can then be disposed of on a dump or the like without danger of fire, atmospheric or stream pollution.

We have also found that the oil can be efficiently removed from the solids in the lime sludge by acidifying the lime sludge to a pH of 1 to 6.9, agitating thoroughly and then allowing the solids to settle out or preferably be filtered out. By this means 92 to 98 per cent of the oil contained in the lime sludge is recovered.

Crushed benzol acid coke when added to lime sludge or a mixture of lime sludge and oil-water emulsion in sufficient quantities to bring the pH to 1 to 6.9 causes coagulation. The solids containing the finely divided and neutralized acid coke can then be disposed of on a dump or the like without danger of fire or atmospheric or stream pollution.

The desired acidity can also be obtained by the addition of sulphuric acid, pickle liquor, $SO_2$ from flue gases or from the steaming of benzol acid, etc., to the mixture of oil-water emulsion and lime sludge.

In our case we prefer to bring the pH to 2 to 3 and filter the solids from the oil and water. The filter cake consisting principally of calcium sulphate can then be calcined to remove the organic impurities and sold on the open market or utilized for the production of ammonium sulphate.

The following procedures are typical examples:

*Example 1.*—8,000 gallons of petroleum oil-water emulsion is mixed with 2,000 gallons of lime sludge containing 2,000 pounds of solids. Sufficient ground benzol acid coke is then added to bring the pH to 3.0. After thorough agitation, the mixture is filtered. The filtrate then goes to a decanter where the petroleum oil mixed with light oil is removed from the water. The enriched petroleum oil then goes to a stripping still to recover the light oil. The petroleum oil is added to the absorbing oil system. The filter cake is then calcined and the recovered calcium sulphate disposed of.

*Example 2.*—To 10,000 gallons of lime sludge, sufficient sulphuric acid is added to bring the pH to 3.0. After thorough agitation the mixture is filtered. The filtrate goes to a decanter where the light oil is separated from the water. The recovered light oil is added to the pure still to recover the pure product. The filter cake is then disposed of in any desired manner.

We claim:

1. In the recovery and refining of coke-oven light oil, the method of treating the emulsion of oil and water obtained during processing of the absorbing oil and the lime sludge obtained from the neutralization with milk of lime of the acid remaining in the light oil and fractions thereof after washing the same with sulphuric acid, including intermixing said emulsion and said sludge and acidifying the resulting mixture to a pH of from 1 to 6.9, whereby to permit separation of the oils in said mixture from the water and solids in said mixture.

2. In the recovery and refining of coke-oven light oil, the method of treating the emulsion of oil and water obtained during processing of the absorbing oil and the lime sludge obtained from the neutralization with milk of lime of the acid remaining in the light oil and fractions thereof after washing the same with sulphuric acid, including intermixing said emulsion and said sludge and acidifying the resulting mixture to a pH of from 1 to 6.9 by the addition to said mixture of benzol acid coke obtained by steaming the sulphuric acid used in the refining of light oil and fractions thereof, whereby to permit separation of the oils in said mixture from the water and solids in said mixture.

HOBART W. SEYLER.
JOSEPH H. WELLS.